United States Patent [19]

Douthart et al.

[11] Patent Number: 4,467,257

[45] Date of Patent: Aug. 21, 1984

[54] MULTIPLE SPEED INDUCTION MOTOR

[75] Inventors: Robert H. Douthart, Burlington, N.C.; Howard W. Smith, West Carrollton, Ohio

[73] Assignee: A. O. Smith Corporation, Milwaukee, Wis.

[21] Appl. No.: 433,244

[22] Filed: Oct. 7, 1982

[51] Int. Cl.³ .............................................. H02P 1/48
[52] U.S. Cl. ...................................... 318/774; 318/786
[58] Field of Search ............... 318/773, 774, 775, 786, 318/787, 790, 785, 793

[56] References Cited

U.S. PATENT DOCUMENTS

| | | | |
|---|---|---|---|
| 2,669,683 | 2/1954 | Burdett | 318/775 |
| 3,153,184 | 10/1964 | Stout | 318/774 |
| 4,341,987 | 7/1982 | Fisher | 318/774 |

*Primary Examiner*—David Smith, Jr.

*Attorney, Agent, or Firm*—Andrus, Sceales, Starke & Sawall

[57] ABSTRACT

An AC induction motor has a two-pole run winding connected directly to power, a four-pole run winding connected to power by a "Triac" switch, and a separate start winding connected to power by a "Triac" switch and a centrifugal start switch. The centrifugal switch is connected between a common node to the start "Triac" and either one or the other of the power terminals. The motor always starts as a two-pole start and two-pole run winding motor. Depending upon the power terminal connection, the motor continues to run with power supplied to the two-pole run winding, or actuate the "Triac" switch of the four-pole winding to operate as a four-pole motor. In different embodiments, the centrifugal switch is connected between the start circuit terminal and either the power terminal of the four-pole winding or of the two-pole winding.

19 Claims, 3 Drawing Figures

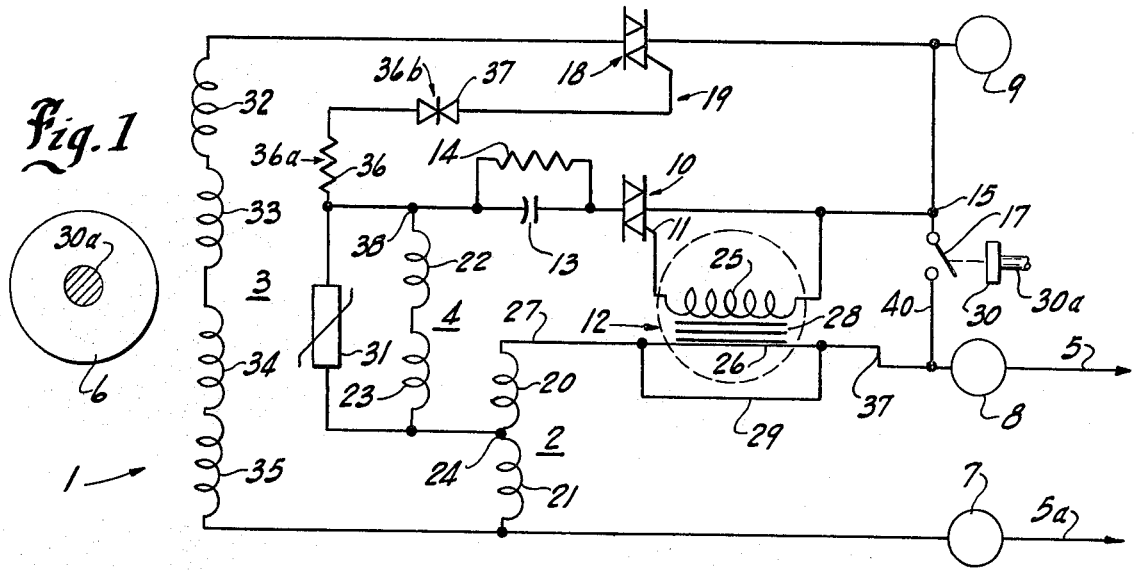
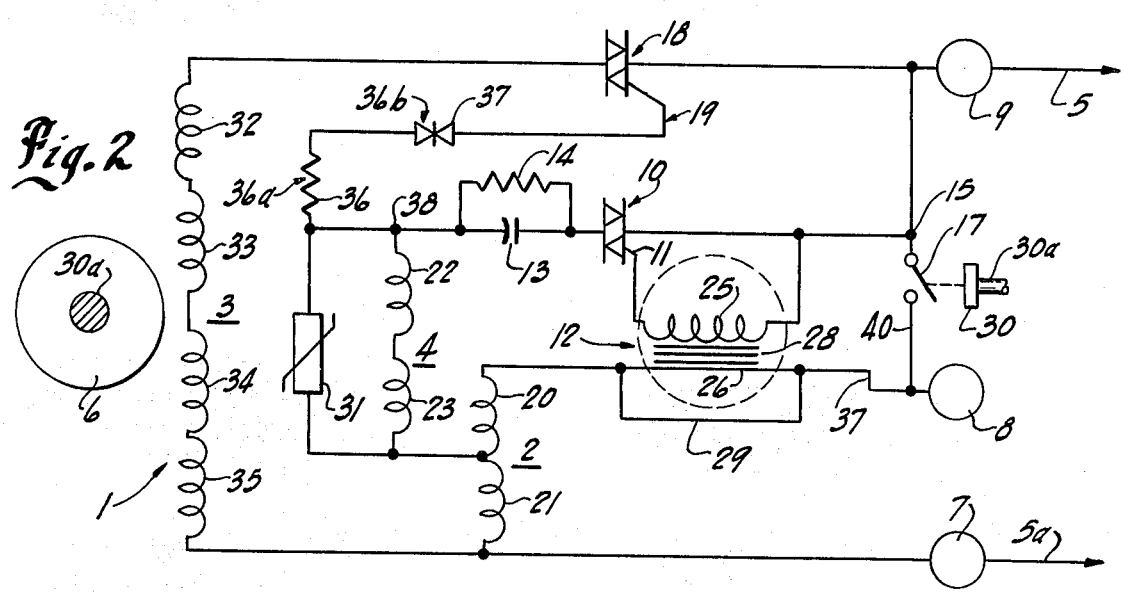
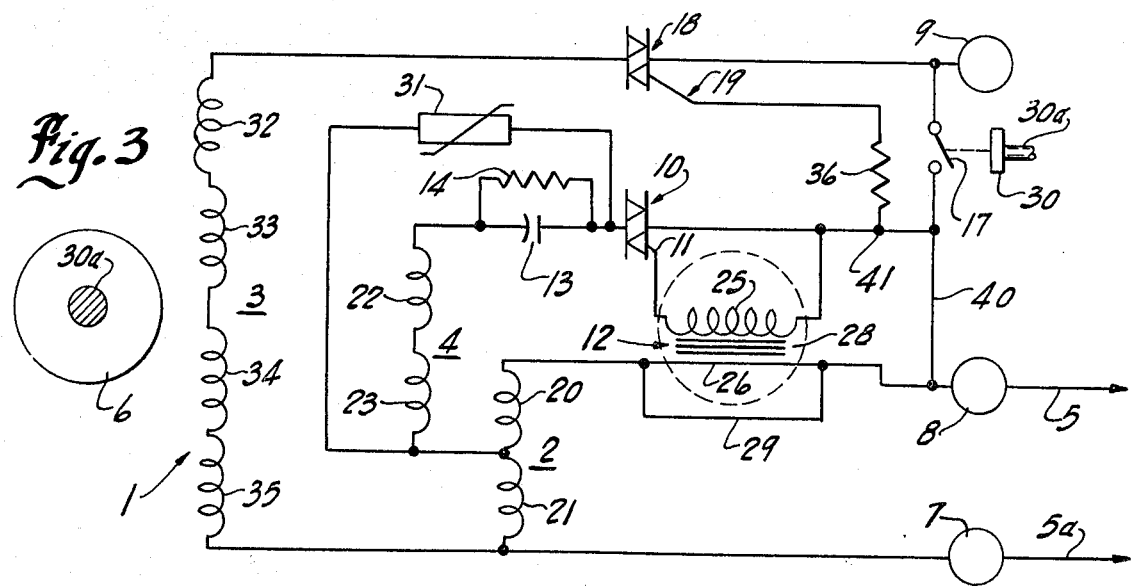

MULTIPLE SPEED INDUCTION MOTOR

BACKGROUND OF THE PRESENT INVENTION

The present invention relates to a multiple speed induction motor and particularly to an induction motor having a running winding means and a starting winding means which is disconnected as the motor reaches or approaches operating speed.

The induction motor is widely employed in industrial, institutional and domestic applications. Single speed induction motors are constructed with a run winding connected in parallel with a starting winding and a series connected phase shift capacitor. A centrifugal switch unit or an electromagnetic switch unit is connected in the circuit of the start winding to disconnect the start winding at a selected speed. Although centrifugal and mechanical switches have been employed for many years, solid state switches devices have more recently been provided in place of the centrifugal switch. For example, General Electric application note 200.35, page 16, discloses an AC split-capacitor start motor in which a starting winding is connected in parallel with the running winding. The starting winding circuit includes a starting capacitor and a solid state switch shown as a "Triac". The solid state switch has a gate circuit coupled to the incoming power supply lines through a current transformer. The solid state switch is gated on only until the motor approaches running speed and then turns off to disconnect the start winding with the motor current at the normal operating level. The solid state switch replaces the conventional centrifugal switch or electromechanical relay. In either instance, the cut out switch is designed to open at a selected speed thereby removing the starting winding and maintaining motor operation under efficient operating conditions with only the running winding connected to the power lines. In certain applications, different but constant speeds may be desired. Multiple speed induction motors have been suggested in which the connection of a winding means which is wound in different pole arrangements is selectively connected in circuit by a selection switch and a centrifugal switch to permit operation of the motor at different speeds and with a single start winding unit. For example, U.S. Pat. No. 26,179 to Brammerlo et al which issued Mar. 21, 1967 discloses a multiple speed induction motor having a first run winding which is wound as a four pole winding and a second combined start and run winding which is wound as a six-pole winding. A centrifugal switch connects the six-pole winding in circuit as a start winding and the four-pole winding as the run winding, such that the motor always starts as a four-pole motor. The motor however runs as either a four-pole motor or a six-pole motor depending upon the positioning of a mechanical selection switch which connects the incoming power supply lines to the windings in different arrangements. For four-pole motor operations, the centrifugal switch disconnects the second start winding and leaves only the first winding in circuit. For six-pole motor operation, the second start winding is reconnected to operate as a six-pole run winding with the first winding disconnected. Other patents which similrly show means for switching between four-pole operation and six-pole operation include U.S. Pat. No. 2,774,024 and 1,918,323.

Although such dual speed motors have been suggested, there is a need for a simple but reliable winding and switch control for such a dual wound and speed motor.

SUMMARY OF THE PRESENT INVENTION

The present invention is particularly directed to an improved AC induction motor having a separate run winding for each speed and a separate start winding with the windings selectively connected to a plurality of power terminals which in turn are selectively connected to a single phase incoming power supply, and includes a speed responsive switch, a solid state start switch controlling the start winding and a second solid state switch controlling a switched speed winding. In accordance with a preferred and unique embodiment of the present invention, a first non-switched run winding having a relatively low number of poles is connected directly to a corresponding run power terminal and thus to the incoming power supply lines and is always connected during the starting of the motor as a main start winding. A second switched run winding is selectively connected into the circuit and particularly operatively to its power terminal by a solid state gated run switch only in response to a power connection to such power terminal to effect the second operational or speed mode of the motor. The non-switched run winding is connected either directly to the main supply terminals for the first operational mode and selectively in series with the speed change switch in the second operational mode. The terminology "switched" and "non-switched" is used herein to differentiate between the two run windings based on the special gated switch which is only present in the circuit of the one run winding to its power terminal. A separate start winding is connected in circuit in series with a solid state switch to a common connection or node between the two power terminals of the run windings. A centrifugal switch or other motor speed sensitive switch is connected between said common node and one of said power terminals and selectively connects the start winding into circuit with the first run winding to start the motor. Depending upon the incoming power connection, operation of the start switch changes the power connection to establish operation with power to the appropriate run winding and disconnection of the starting winding from the start circuit and from the power supply. The start switch may be selectively connected into the circuit to control the supplying of power to the start winding, and dependig upon the power connection to operate to remove the start winding while the main power connection maintains power to the run winding, or alternatively and simultaneously disconnects the first run winding and connects the second run winding in circuit. The centrifugal or other speed switch is thus connected in circuit with the solid state switches to conjointly control the application of power to the two separate run windings and the separate start winding. The start switch particularly functions to control the reconnection of the gate input to the solid state run switch for controlling and introducing the switched run winding into the circuit with, and only with, the input power connected to the corresponding power terminal.

In a first preferred embodiment, the start switch connects the start winding terminal to the nonswitched run winding power terminal. The power terminal of the main or the switched run winding is connected to the input terminal of the start winding circuit. In operation, the motor starts in the same configuration with the non-switched run winding and start winding in circuit.

At the selected speed, the start switch opens disconnecting the start winding. Depending upon the power terminal connection, the motor continues to run with power supplied to the non-switched run winding or to actuate the solid state run switch of the switched run winding to supply power to the switched run winding.

In a different switch speed arrangement, a centrifugal or other speed responsive switch is connected between the start circuit terminal and the power terminal of the switched main winding, with the opposite power terminal for the non-switched run winding connected directly to the start circuit terminal. The motor starts in the same mode as in the previous embodiment, with the non-switched run winding energized with the starting winding. At a selected speed, the solid state start switch is de-energized and the start winding is disconnected. The motor then continues to run at the desired speed with the non-switched winding in circuit. The operation of the centrifugal switch opens the circuit of the switched run winding, but in this position, the circuit of such winding is not operative and does not effect the motor operation thereof. When power is supplied to the alternate power terminal power of the switched run winding the motor again starts with the non-switched run winding and the start winding connected in circuit through the centrifugal switch. The gate of the solid state run switch for the switched run winding is held at a turn off potential by the centrifugal switch. The motor again starts in the same manner as the conventional motor and at the selected speed below that of the drop-out of the solid state start switch, the centrifugal switch opens and removes power from the starting circuit and simultaneously from the non-switched run winding. Power now only appears across the switched run winding and the gate of its switch. In this second power position, however the potential of the gate of the solid state switch of the switched winding is coupled to the potential of the power terminal. A gate potential signal is thus applied to the solid state run switch and turns such switch on to connect the switched run winding into circuit. The motor thereby continues to operate in the alternate mode with switched run winding in circuit.

The present invention thus provides a simple reliable means using readily available solid state switches and speed responsive switches for connecting a start winding to one run winding for starting and then selectively connecting one of two run windings into the circuit for creating a multiple speed motor.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a schematic illustration of a multiple speed motor including a two-pole run winding and a four-pole run winding and connected for a two-pole run mode of motor operation;

FIG. 2 is a view corresponding to FIG. 1 showing the alternate circuit connection for a four-pole run mode of motor operation;

FIG. 3 is a view similar to FIG. 1 showing an alternate connection of a centrifugal start switch for providing different switching speeds in the two-pole run mode and the four-pole run mode.

DESCRIPTION OF THE ILLUSTRATED EMBODIMENT

Referring to the drawings and particularly to FIG. 1, a multiple speed A.C. induction motor is schematically illustrated. The A.C. induction motor shown is a single phase motor adapted to operate as a two-pole or four-pole motor and thus at two selected speeds. Any other suitable combination of operating poles may be used by appropriate winding construction. In the illustrated embodiment, the motor stator 1 includes a two-pole run winding 2 and a four-pole run winding 3 which are connected in a motor circuit with a start winding 4. A set of single phase power supply lines 5 and 5a is selectively connected to supply power to the windings 2-4. A rotor 6 is coupled to the stator 1 and operates to produce a motor output based upon the energization of windings 2-4. The windings 2-4 are connected to power lines 5-5a by separate terminals power connection means or including a common power terminal 7, a two-pole run power terminal 8 and a four-pole run power terminal 9. In FIG. 1, power supply terminal 7 is connected as the common supply to line 5a for all three windings 2-4 inclusive. The two-pole power terminal 8 and the four-pole power terminal 9 are selectively connected to the power line 5 as shown respectively in FIGS. 1 and 2 for operating of the motor as a two-pole motor or a four-pole motor. Thus, only one of the power terminals 8 and 9 is connected to the supply power line 5, depending upon the desired motor operating mode. Although shown as a direct connection, suitable switching means can of course be provided for connection of the incoming power lines to the motor terminals.

In both circuit connections power is also supplied to the start winding 4 which is connected in circuit to both terminals 8 and 9. The circuit for the start winding 4 includes a solid state gated switch 10 which is schematically shown as a well known thyristor sold under the trademark "Triac" by General Electric Company. The switch 10 has a gate 11 selectively coupled to the circuit of run winding 2 by a coupling transformer 12 for turning the switch on and thereby supplying power to the starting winding 4. The start winding circuit also includes a series-connected capacitor unit including a start capacitor 13 in parallel with a resistor 14. The resistor 14 in a preferred embodiment has a wattage rating of ten (10) watts or less and a resistance of at least substantially 3,500 ohms and no more than substantially 50,000 ohms, with the range including the normal tolerances for bleeder resistor. The start winding circuit has a common line to power terminal 7 and a start circuit terminal 15 which is connected in circuit common to terminals 8 and 9. In the illustrated embodiment of FIG. 1, a centrifugal switch 17 is shown interconnecting terminals 8 and 9, with start circuit terminal 15 connected to the common connection to power terminal 9 and the switch 17.

The two-pole winding 2 is connected directly to its power terminal 8. The winding 2 is thus provided with power directly from terminal 8 or through centrifugal switch 17 from terminal 9. The four-pole winding 3 is connected to the four-pole power terminal 9 in series with a solid state gated switch 18 having a gate 19 for turning the switch on. The solid state switch 18 is normally open and holds the circuit de-energized or open. The switch 18 is turned on and four-pole run winding 3 powered, as described hereinafter, only when the power terminal 9 is connected to the power supply line 5, and then after operation of switch 17. Thus, the gate 19 of switch 18 is connected in circuit by gate branch circuit 19a which is connected to the circuit of the solid state start switch 10. The start branch circuit is such that the gate 19 is only provided with sufficient turn-on current to operate switch 18 with the motor started via application of power to terminal 9 and the start switch 17 open, as more fully described hereinafter. The initial connection of motor power always supplies power to the two-pole winding 2, and through the solid state switch 10 to the start winding 4 such that the motor always starts as a two-pole wound motor. This power connection is maintained even when the power line 5 is connected to the four-pole input terminal 9 as a result of the connection of the centrifugal switch 17 directly between terminals 8 and 9.

With the line 5 connected to terminal 8, the motor starts as a two-pole motor. When the centrifugal switch 17 opens, power is removed from the starting winding 4 and the motor continues to run in the two-pole motor mode. When power line 5 is connected to terminal 9, as shown in FIG. 2, the motor again starts as a two-pole motor. Gate 19 is held at the potential of line 5 and is held off. At the selected speed, the centrifugal switch 17 again opens, which removes power from the two-pole run winding 2. The disconnection of this winding 2 removes power from transformer 12 and therefore switch 10 which turns off and disconnects start winding 4. When switch 17 opens, a bias signal is applied through resistor 36 to the gate 19 of the solid state switch 18 which turns on and supplies power to the four-pole winding 3. The motor now runs as in the four-pole winding.

More particularly, the two-pole winding 2, as shown in FIGS. 1 and 2, includes a pair of series-connecting windings 20 and 21 connected directly between the power terminal 7 and the two-pole power terminal 8. The start winding 4 is a two-pole winding including windings 22 and 23 which are wound in the conventional manner and angularly offset with respect to the run windings 20 and 21. The start winding 4 is shown connected to common power terminal 7 between a common connection 24 of the windings 20 and 21 of run winding 2. The opposite side of start winding 4 is of course connected in series with the start capacitor 13 and solid state switch 10 to the start terminal or connection 15.

The solid state switch 10 is shown as a known "Triac" with the main power terminals connected between the start capacitor 13 and the common terminal 15. The input gate 11 is powered during each half cycle of the A.C. power supply. In the illustrated embodiment of the invention, gate power is derived from the circuit of the two-pole run winding 2. The current transformer 12 is shown having a secondary winding 25 connected between the gate 11 and main terminal 1 of the solid state switch 10. The primary winding 26 of the current transformer 12 is shown defined by a series of the connecting lead 27 between the two-pole winding 2 to the corresponding input terminal. A magnetic core 28, shown diagrammatically, may encircle or loop the lead primary 26 to induce a voltage in the secondary 25. A calibrating shunt 29, which may be a suitable resistance wire element, is shown connected in parallel with the primary 26. The calibrating shunt resistor 29 is selected in the first embodiment to maintain current for all speeds below the setting of the centrifugal switch 17.

When power is supplied to the two-pole run winding 2, the current flow through section 26 induces a turn-on current in the secondary winding 25 which is applied to the gate 11 to turn on solid state switch 10, thereby simultaneously providing current to and through the start winding 4.

The MOV 31, as in a single speed motor system, has been found to stabilize the circuit operation and in particular minimizes creation of over voltage spikes at the terminal of the gated switch. Overvoltage transient conditions tend to create erratic conduction through the switch whenever the gated switch switches from full on to full off. This has been found to provide a particularly satisfactory motor operation. The four-pole gated switch 18 is switched off only by removal of the main power supply and such protective means need not be provided.

The centrifugal switch 17 is diagrammatically illustrated as a mechanically actuated switch unit which has been and is used in capacitor-start induction motors. A centrifugal operator 30 is coupled to the switch 17 and is mounted to the rotor shaft 30a as diagrammatically illustrated. The shaft 30a rotates at motor speed. At a selected speed, the centrifugal operator 30 moves to open the switch 17, thereby opening the power connection from the power terminal 8 to the node 15 of the start winding circuit, and thereby operates to open the power supply connection to the starting winding branch of the circuit. In the illustrated embodiment of the invention, a resistor 31 such as the known metal oxide varistor (M.O.V.-1) is connected between the main terminal member 2 of the gated start switch 10 and the line connection of the start branch and thus in parallel with the start capacitor network and the start winding 4.

The centrifugal switch 17 also controls the application of start power to windings 2 and 3 when power line 5 is connected to the four-pole terminal 9. The four-pole winding 3 includes four equicircumferentially windings 32, 33, 34 and 35. The several individual windings 32–35 are connected in series with each other and the solid state gated switch 18 between terminals 7 and 9. Switch 18 is also shown as a Triac with its gate 19 connected in circuit by the gate branch circuit 19a to the start capacitor circuit. The branch circuit 19a includes a gate bias resistor 36 connected in series with a bidirected blocking element, such as a "Diac" 37. The resistor is shown connected to a common node or connection 38 between the capacitor 13 and the two-pole start winding 4.

The gate potential of switch 18 is thus controlled by the state of the start switch 10 and with switch 17 closed, the gate branch circuit is connected to the power, but insufficient gate current is supplied to turn switch 18 on because of the resistor 36 and the "Diac" 37. With switch 17 open, the gate 19 is connected to terminal 7 through the start winding 4 and winding 21 of the two-pole run winding, and if switch 10 is also open, the gate potential can rise and sufficient current supplied to turn switch 18 on. If power is also supplied to terminal 9, power is then supplied to the four-pole winding 4.

Thus as noted previously, the motor may be operated as either a two-pole run motor, as shown in FIG. 1, or alternately as a four-pole motor, as shown in FIG. 2.

Referring particularly to FIG. 1, in the two-pole mode, lines 5 and 5a are connected to the terminal 7 and 8. Current first flows through the direct connected two-pole winding 2. The current through the coupling lead 26 generates a firing current to the gate 11 of the solid state start switch 10 which turns on. Essentially instantaneously, current is supplied to both the run winding 2 and the start winding 4. The motor of course starts in accordance with well known theory of induction motors and accelerates. At a preselected speed, depending upon the setting and construction of the centrifugal operator 30, switch 17 opens. This, of course, removes power from the start winding node 15 and thus from the start winding circuit. The motor continues to run as a two-pole motor.

The power at terminal 8 is also applied to the gate resistor 36 and the gate 19 of the solid state control switch 18 for the four-pole run winding 3. However, the centrifugal switch 17 also connects the corresponding main terminal 18-1 of the solid state switch 18 to the power terminal 8. Consequently, the gate and main terminal 18-1 are held at essentially the same potential, which prevents turn on of switch 18. When the centrifugal switch 17 opens, the main power terminal 8 and the interconnected power supply line 5 are disconnected from the main terminal 18-1 of switch 18 and winding 3 is operatively disconnected even though turn on power is now supplied to gate 19. The motor thus operates as a two-pole motor, as described above.

To establish a four-pole motor operational mode, the power lead 5 is disconnected from terminal 8 and connected to terminal 9 and common power line 5a is again connected to the common terminal 7, as shown in FIG. 2. In this connection, current initially flows from the four-pole terminal 9 directly to the node 15 and to the start winding circuit, which is of course initially off because of the open state of the solid state switch 10. Power and current also flows however through the closed centrifugal switch 17 to and through the two-pole winding 2, including the coupling transformer 12 as in the two-pole connection of FIG. 1.

Run winding 2 is energized, causing switch 10 to conduct and supply current through the two-pole start winding 4, and in the same manner as just described with respect to the two-pole mode of operation. This establishes a similar rotational acceleration of the motor rotor 6.

During this initial start period, power is supplied to the main terminal 18-1 of the four-pole switch 18 and also through the centrifugal switch 17 to the bias resistor 36. Again insufficient gate current is supplied to turn-on the switch 18. Switch 18 is thus held off, and prevents application of power to the four-pole winding 3.

The motor thus accelerates as a two-pole motor. At a selected speed, the centrifugal switch 17 again opens. This now, however, removes power from the two-pole winding 2 and from the transformer 12, such that switch 10 is no longer powered on. This removes both the capacitor 13, phase winding 22-23 and the two-pole winding 2 from the circuit. However, the winding 2 now connects the bias resistor 36 to the common terminal 7 and therefore to supply line 5a. With no current flow in the winding 20-23, an open circuit potential shift from the input terminal of to the gate input node between the start winding 22 and 23 and the start capacitor 13 occurs. An increased potential signal is therefore applied to the gate 19 of the solid state switch 18 and a turn-on current flows through the gate resistor 36, Diac 37 and gate 19, to main terminal 18-1 of switch 18 to the opposite terminal 9. The increased potential is sufficient to establish the necessary gate current to turn on switch 18. The conduction of the switch 18 supplies power directly from the supply line 5 to the series connected four-pole windings 32-35. The motor then operates in a four-pole operating mode and accelerates to its four-pole operating speed.

The present invention with the two solid state switches and a suitable speed responsive switch provides a convenient and reliable multiple speed motor employing readily available, commercial components.

With the embodiment of the invention illustrated in FIG. 1, the centrifugal switch 17 directly establishes a corresponding switching speed setting for both the two-pole motor speed mode and the four-pole motor speed mode. In certain applications, it may be desirable if not required, that the switching speeds differ for the different operating speed modes. Generally, a higher switching speed will be required for the two-pole operating mode than that required for the four-pole operating mode. A simple modification, such as shown in FIG. 3, to the circuit of FIG. 1, permits operating in the two modes in combination with individual speed settings for the two-pole and fourpole modes. Generally, in the modified circuit the centrifugal switch 17 is functionally operable only during the four-pole motoring mode. The elements in the embodiment of FIG. 3 corresponding to those in the embodiment of FIG. 1 are identified by the same numbers for simplicity and clarity of explanation.

In FIG. 3, the centrifugal switch 17 is connected between the four-pole input terminal 9 and the starting circuit node 15 while a direct connection of terminal 8 and start circuit node 15 is established by a lead 40. In addition, the gate 19 of the four-pole switch 18 is connected in series with the bias resistor 36 directly to the start winding circuit, as at 41. In the second embodiment the calibrating shunt 29 is again selected to maintain turn-on power to the gated start switch 10 to a speed which is higher than the operating or switching speed of centrifugal switch 17. The alternate embodiment of the invention as illustrated in FIG. 3 otherwise includes all of the connections previously described.

The operation of the second embodiment is briefly as follows.

With power line 5 connected to terminal 8, the motor starts as a two-pole motor. Power is simultaneously applied directly to the two-pole winding 2 which establishes a turn-on signal to the gated switch 10. Current flow from terminal 8 through lead 40 to the gated switch 10 for energizing of the start winding 4. The motor accelerates. Before the motor reaches the selected operating speed, the centrifugal switch 17 opens. In this embodiment, switch 17 however is not connected into the circuit of either the starting winding 4 or the two-pole run winding 2, when power is supplied via terminal 8, and consequently does not affect the two-pole motor operation. The motor thus continues to accelerate until the higher two-pole motor switching speed is reached. At the two-pole motor switching speed the current through the primary section 26 of the coupling transformer 12 establishes by the calibrating shunt 29, reduces the turn-on signal to the gated switch 10 below the necessary firing level. The switch 10 now turns off and effectively removes the starting winding 4, which then continues to run in the two-pole motor mode.

In the alternate or four-pole motor, power line 5 is again connected to terminal 9 in the second embodiment. The motor again starts as a two-pole motor. Thus, power is supplied from terminal 9 through the centrifugal switch 17 to starting winding 4 and simultaneously through the connecting lead 40 to the main winding 2. The current through the main winding 2 and the primary section 26 of transformer 12 fires or turns on gated switch 10. Current now flows through both windings 2 and 4 and the motor accelerates in the two-pole mode. At the selected lower four-pole switching speed, the centrifugal switch 17 opens. This removes power from both the start winding branch and from the two-pole winding 2. The opening of switch 17, in the embodiment of FIG. 3, reconnects the circuit with the gate 19 of the switch 18 disconnected from power terminal 9 and connected to series resistor 36 to the run winding through the connection 41 and lead 40 to winding 2. As the result, a turn-on gate signal is applied through resistor 36 to the gate 19 of the solid state switch 18. This of course turns on switch 18 and supplies power to the four-pole winding 3. The motor now runs in the four-pole mode and thus at the desired lower speed.

The illustrated embodiments are preferred circuits. Other forms of the invention may be provided. For example, a circuit similar to that of FIG. 1 has been used wherein the gate circuit of switch 18 was connected directly to the power terminal 8, as shown in FIG. 3. Although the circuit provides appropriate two-pole and four-pole operation with a common switch speed, undesirable torque distortions were found to exist which are not found in the preferred circuit of FIG. 1.

The present invention thus provides a reliable multiple speed motor employing a pair of separate solid state switch means for the start winding and for the one run winding but which operates conjointly and in conjunction with the single speed-responsive switch to function as a two-speed motor stationary switch.

Various modes of carrying out the invention are contemplated as being within the scope of the following claims, particularly pointing out and distinctly claiming the subject matter which is regarded as the invention.

We claim:

1. A multiple speed motor comprising a first speed winding means, a second speed winding means, a start winding means, three power terminals including a first power terminal connected to the first speed winding and a second power terminal connected to the second speed winding and a common power terminal connected to said first and second speed windings, first and second separate switch means for said start winding means and for the second of said first and second speed winding means, a speed responsive switch means, circuit means connecting said start winding means to said common power terminal and to one of said first and second power terminals and connecting said start winding means to the other of said first and second power terminals in series with said speed responsive switch means, and said separate switch means and said speed responsive switch means being constructed and connected to conjointly operate to simultaneously energize said first speed winding and said start winding during an initial start period and at selected speed operable to de-energize said start winding and to energize only one of said first speed winding and said second speed winding in accordance with the power connection to said first and second power terminals.

2. The motor of claim 1 wherein said second separate switch means includes a first gated run switch means connected to control energization of the second speed winding, a starting capacitor is connected in series with said start winding means, said first separate switch means includes a second gated start switch means connected in a starting branch circuit with the capacitor and start winding means between the three power terminals for controlling energizing of the start winding means, said speed responsive switch means selectively controlling application of power to the gate and main circuits of the first and second gated switch means and thereby energization of said second speed winding means and said start winding means in accordance with the power connection to said first and second power terminals.

3. The motor of claim 2 wherein said first and second gated switch means and said speed responsive switch means are conjointly operable to start the motor with said first speed winding and said start winding means energized, said second gated switch means being responsive to a selected speed above the operating speed of said speed responsive switch to open the circuit to said start winding means to operate the motor with power applied to the first power terminal, said first gated switch means being responsive to operation of said speed responsive switch means to energize only said second speed winding with power applied to said second power terminal.

4. The motor of claim 2 wherein said first gated switch means includes a gate, a gate circuit including a voltage dropping means connected between said gate and said starting branch circuit to connect the gate to the common power terminal.

5. The motor of claim 4 wherein said voltage dropping means includes a resistance means in series with a bidirectional conductive diode means.

6. The motor of claim 4 or 5 including a metal oxide varistor connected in parallel with said gated start switch means and said start means; and a resistor connected in parallel with said capacitor and having a wattage no greater than ten watts and a resistance in the range of 3,500 to 50,000 ohms.

7. The motor of claim 2 including a metal oxide varistor connected in parallel with said gated start switch means and said start winding means.

8. The motor of claim 7 including a resistor connected in parallel with said capacitor and having a wattage no greater than ten watts and a resistance in the range 3,500 to 5,000 ohms.

9. The motor of claim 1 wherein said speed responsive switch means is operable to actuate said second separate switch means only with power supplied to the second power terminal and in response to operation of the speed responsive switch.

10. The motor of claim 1 wherein said second separate switch means is a gate controlled triac means having a gate, a gate circuit including a voltage dropping means and connected to said gate and the start winding whereby turn-on gate current is supplied to said controlled triac means only with said speed responsive switch open and power at said second power terminal.

11. The motor of claim 1 wherein said first speed winding is a two-pole winding, said start winding being connected to the center of the two-pole winding, said start winding is a two-pole winding, and said second speed winding is a four-pole winding.

12. A multiple speed motor comprising a first non-switched speed winding having a first number of poles, a second switched speed winding having a different number of poles, a start winding, a start capacitor, a common power terminal connected to said first and second speed windings, a first speed terminal connected directly to the first non-switched speed winding, a second speed terminal, said first and second speed terminals being adapted to be connected to one side of a power supply with said common terminal connected to the second side of power supply, a solid state gated run switch connecting said second switched speed winding to said second speed terminal and having a gate means, a gated start switch means having a gate means coupled to the first speed winding, a start branch circuit including series connection of said start winding with said start capacitor and said gated start switch means, a speed responsive switch connected between said first and second power terminals, said start branch circuit having one connection to a common node between said speed responsive switch and one of said power terminals, said gate means of said solid state gated run switch being connected to said start branch circuit and energized in response to operation of said speed responsive switch to condition said switched speed winding for operation, said start switch means with said speed responsive switch means being conjointly operable to simultaneously energize said first speed winding and said start winding during an initial start period independent of connection to which of said first and second power terminals are connected to said power supply and at a selected speed operable to open the circuit from the one power terminal to said start winding and to selectively connect said first speed winding to establish a first speed mode of operation and said second speed winding to establish a second speed mode of operation in accordance with which of said first and second power terminals is connected to power supply.

13. The motor of claim 12 including the start branch circuit being connected in circuit in series with a part of said first non-switched speed winding.

14. The motor of claim 12 wherein said start winding means is connected directly to said second power terminal and is connected to said first power terminal in series with said speed responsive switch means, said gated run switch means having a gate connected in circuit to said common terminal in series with said start winding, and control means connected between said gate and said start winding to reduce the current supplied to said gate whereby an operative turn-on current is created, only in response to opening of said gated start switch means and said speed responsive switch.

15. The motor of claim 14 including said start capacitor being connected between the start winding and the gated start switch means, and said control means includes voltage dropping means connected to the connection of capacitor to said start winding means.

16. The motor of claim 12 wherein said start winding means is connected directly to said first power terminal and is connected to said second power terminal in series with said speed responsive switch means, said gated run switch means having a gate connected directly to said first power terminal means and to said second power terminal in series with said speed responsive switch means.

17. The motor of claim 12 or 16 wherein a coupling transformer includes a primary section in series with the power connecting lead to said first main winding means, and a shunt means connected in parallel with said primary section to control the supply of power to said gated start switch, said shunt means being selected whereby said start winding is disconnected in response to actuation of said speed responsive switch in one speed mode and at a greater speed than the actuator speed responsive switch in the second speed mode.

18. The motor of claim 12 wherein a coupling transformer includes a primary section in series with the power connecting lead to said first winding means, and a shunt means connected in parallel with said primary section to control the supply of power to said gated start switch, said shunt means being selected whereby said start winding is disconnected in response to actuation of said gated start switch during said first speed mode and in response to actuation of said speed responsive switch in said second speed mode.

19. The motor of claim 17 wherein said first speed winding is a two-pole winding, said start winding being connected to the center of the two-pole winding, said start winding is a two-pole winding, and said second speed winding is a four-pole winding.

* * * * *

UNITED STATES PATENT AND TRADEMARK OFFICE
CERTIFICATE OF CORRECTION

PATENT NO. : 4,467,257
DATED : August 21, 1984
INVENTOR(S) : ROBERT H. DOUTHART ET AL It is certified that error appears in the above-identified patent and that said Letters Patent is hereby corrected as shown below:

Col. 1, Line 46, after "United States (U.S.)" insert ---reissue---
Col. 7, Line 61, after "terminal" delete "of"; Col. 8, Line 22, after "and" delete "fourpole" and substitute therefore ---four pole ---; Col. 10, Line 45, cancel "5,000" and substitute therefore ---50,000---; Col. 10, Line 45, after "range" insert ---of---

Signed and Sealed this

Ninth Day of April 1985

[SEAL]

*Attest:*

DONALD J. QUIGG

*Attesting Officer*  *Acting Commissioner of Patents and Trademarks*